US005610578A

United States Patent [19]
Gilmore

[11] Patent Number: 5,610,578
[45] Date of Patent: Mar. 11, 1997

[54] VEHICULAR VARIABLE BRAKE LIGHT INTENSITY SYSTEM

[76] Inventor: Florent J. Gilmore, 17 Starling Dr., Sherwood Park, Alta T8A 0A6, Canada

[21] Appl. No.: 645,295

[22] Filed: May 13, 1996

[51] Int. Cl.⁶ .................................................. B60Q 1/44
[52] U.S. Cl. .......................... 340/479; 340/463; 340/467; 340/468; 340/469; 307/10.8
[58] Field of Search ...................... 340/479, 467, 340/469, 463, 468; 307/10.8

[56] References Cited

U.S. PATENT DOCUMENTS

| | | | |
|---|---|---|---|
| 3,846,749 | 11/1974 | Curry | 340/479 |
| 4,170,723 | 10/1979 | Arsoy | 340/479 |
| 4,231,013 | 10/1980 | Freeman et al. | 340/479 |
| 4,978,177 | 12/1990 | Ingraham et al. | 340/479 |
| 5,111,182 | 5/1992 | Ishikawa et al. | 340/435 |
| 5,150,098 | 9/1992 | Rakow | 340/479 |

*Primary Examiner*—Jeffery Hofsass
*Assistant Examiner*—Mark S. Rushing

[57] ABSTRACT

A vehicular variable brake light intensity system including at least one light situated on a vehicle. Also included is a brake pedal potentiometer with a pair of contacts. The resistivity between the contacts is adapted to change as function of the motion of the brake arm during braking. Control circuitry is adapted to allow the brake lights to emit light with an intensity which is a function of the amount of deceleration in a first mode of operation. Also, in a second mode of operation, the control circuitry is adapted to actuate the light intermittently upon the deceleration surpassing a predetermined amount.

1 Claim, 3 Drawing Sheets

VEHICULAR VARIABLE BRAKE LIGHT INTENSITY SYSTEM

BACKGROUND OF THE INVENTION

1. Field of the Invention

The present invention relates to a vehicular variable brake light intensity system and more particularly pertains to indicating to other drivers the braking status of a leading vehicle with two modes of operation for differentiating between normal and sudden deceleration.

2. Description of the Prior Art

The use of brake light systems is known in the prior art. More specifically, brake light systems heretofore devised and utilized for the purpose of indicating the braking status of a vehicle are known to consist basically of familiar, expected and obvious structural configurations, notwithstanding the myriad of designs encompassed by the crowded prior art which have been developed for the fulfillment of countless objectives and requirements.

By way of example, the prior art consists of U.S. Pat. No. 4,170,723 to Arsoy; U.S. Pat. No. 4,667,177 to Athalye; U.S. Pat. No. 4,107,647 to Yoshino; U.S. Pat. No. 5,115,162 to Leonard et al.; U.S. Pat. No. 5,089,805 to Salsman; and U.S. Pat. No. 4,721,344 to Frait et al.

In this respect, the vehicular variable brake light intensity system according to the present invention substantially departs from the conventional concepts and designs of the prior art, and in so doing provides an apparatus primarily developed for the purpose of indicating to other drivers the braking status of a leading vehicle with two modes of operation for differentiating between normal and sudden deceleration.

Therefore, it can be appreciated that there exists a continuing need for a new and improved vehicular variable brake light intensity system which can be used for indicating to other drivers the braking status of a leading vehicle with two modes of operation for differentiating between normal and sudden deceleration. In this regard, the present invention substantially fulfills this need.

SUMMARY OF THE INVENTION

In view of the foregoing disadvantages inherent in the known types of brake light systems now present in the prior art, the present invention provides an improved vehicular variable brake light intensity system. As such, the general purpose of the present invention, which will be described subsequently in greater detail, is to provide a new and improved vehicular variable brake light intensity system which has all the advantages of the prior art and none of the disadvantages.

To attain this, the present invention essentially comprises a brake pedal potentiometer. The brake pedal potentiometer includes a brake pedal with a brake arm hingably coupled at an inboard end to a vehicle. A pad is fixed to an outboard end of the brake pedal. A frame is integrally formed at an intermediate extent of the brake arm. The frame includes a top face coupled to the brake arm, a bottom face coupled to the brake arm beneath the top face, and a pair of closed side faces coupled between the top face and bottom face. The frame thus has an interior space with access afforded thereto via a pair of opposite open side faces. The open side faces are situated perpendicularly with respect to the direction of motion of the brake arm. The brake pedal potentiometer further includes an arcuate rod with a predetermined resistivity coupled at a first end to the vehicle. The rod is situated within the interior space of the frame in axial alignment with the direction of motion of the brake arm. A spring biased contact is positioned on an interior surface of one of the closed side faces with the spring biased contact abutting the potentiometer. A guide roller is situated on a closed side face opposite the spring biased contact. Another contact is connected to the inboard end of the rod. As such, the resistivity between the contacts changes with the motion of the brake arm during braking. As shown in FIG. 5, a variable voltage regulator is connected to the contacts of the brake pedal potentiometer. The variable voltage regulator is included for producing a ramp voltage at an output thereof. Such voltage ramp is a function of the resistivity between the contacts. Also included is a power amplifier having a pair of outputs connected to a set of conventional brake lights. An input of the power amplifier is connected to the output of the variable voltage regulator for providing power to the brake lights. The power provided is a function of the ramp voltage of the variable voltage regulator. A peak detector includes an input coupled to the output of the variable voltage regulator and an output connected to the power amplifier. The peak detector thus disables the power amplifier upon the detection of a predetermined voltage at the input thereof. Further included is an oscillator having an input connected to the output of the peak detector. The peak detector produces a triggering signal at an output thereof upon the detection of the predetermined voltage by the peak detector. Also shown in FIG. 5, a multivibrator is included having an input connected to the output of the oscillator. The multivibrator is adapted to produce a smooth pulse at the output thereof. The pulse is a function of the triggering signal of the oscillator. A high speed amplifier has a pair of outputs connected to the brake lights and an input connected to the output of the multivibrator. The high speed amplifier is included for intermittently providing power to brake lights. The power is a function of the pulse of the variable voltage regulator.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicular variable brake light intensity system which has all the advantages of the prior art brake light systems and none of the disadvantages.

It is another object of the present invention to provide a new and improved vehicular variable brake light intensity system which may be easily and efficiently manufactured and marketed.

It is a further object of the present invention to provide a new and improved vehicular variable brake light intensity system which is of a durable and reliable construction.

An even further object of the present invention is to provide a new and improved vehicular variable brake light intensity system which is susceptible of a low cost of manufacture with regard to both materials and labor, and which accordingly is then susceptible of low prices of sale to the consuming public, thereby making such vehicular variable brake light intensity system economically available to the buying public.

Still yet another object of the present invention is to provide a new and improved vehicular variable brake light intensity system which provides in the apparatuses and methods of the prior art some of the advantages thereof, while simultaneously overcoming some of the disadvantages normally associated therewith.

Still another object of the present invention is to indicate to other drivers the braking status of a leading vehicle with two modes of operation for differentiating between normal and sudden deceleration.

Lastly, it is an object of the present invention to provide a new and improved vehicular variable brake light intensity system including at least one light situated on a vehicle. Also included is a brake pedal potentiometer with a pair of contacts. The resistivity between the contacts is adapted to change as function of the motion of the brake arm during braking. Control circuitry is adapted to allow the brake lights to emit light with an intensity which is a function of the amount of deceleration in a first mode of operation. Also, in a second mode of operation, the control circuitry is adapted to actuate the light intermittently upon the deceleration surpassing a predetermined amount.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
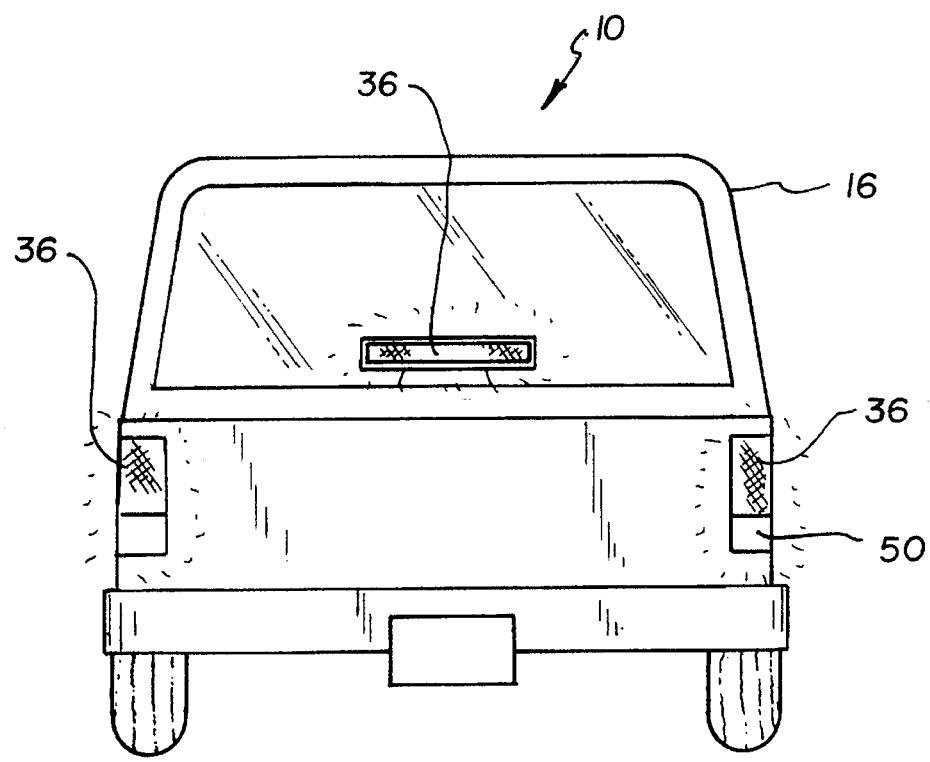
FIG. 1 is an illustration of the preferred embodiment of the vehicular variable brake light intensity system constructed in accordance with the principles of the present invention.
Figure 2:
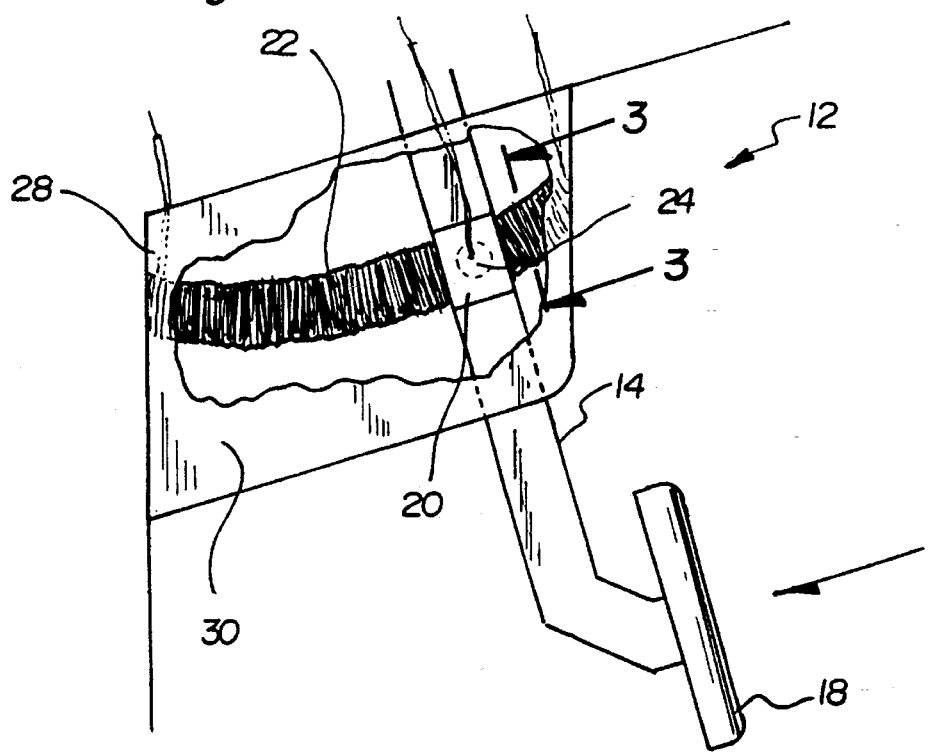
FIG. 2 is a side plan view of the brake pedal potentiometer of the present invention.
Figure 3:
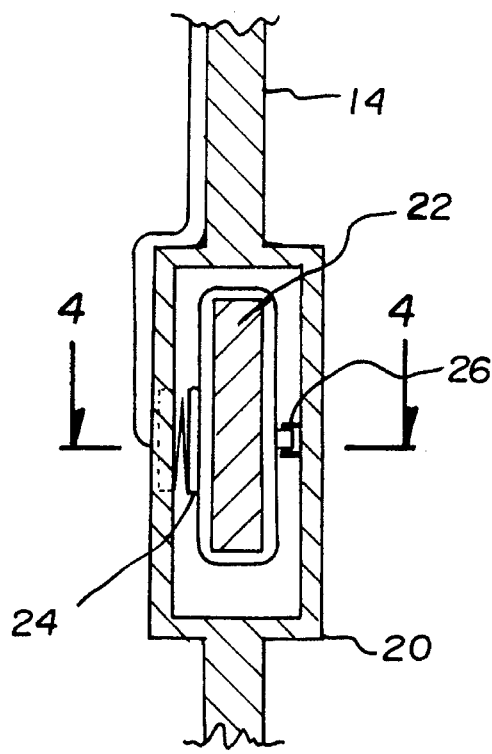
FIG. 3 is a cross-sectional view taken along line 3—3 shown in FIG. 2.
Figure 4:
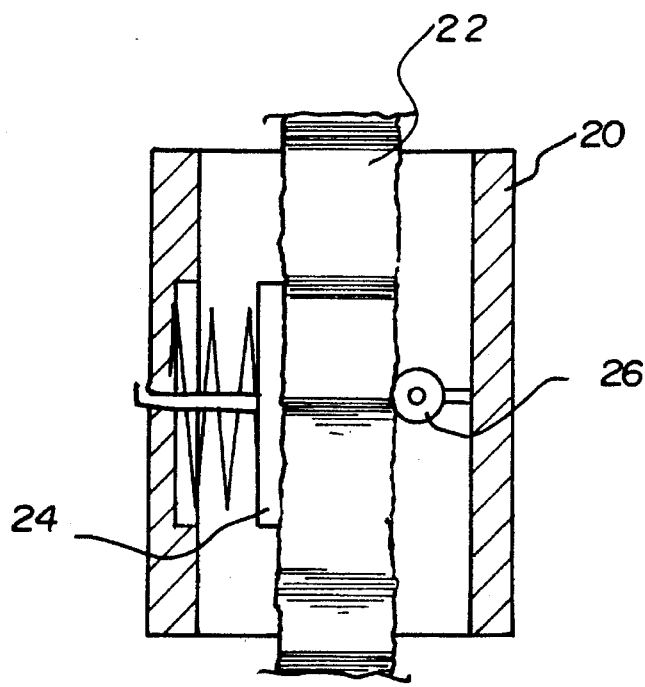
FIG. 4 is a cross-sectional view taken along line 4—4 shown in FIG. 3.

With reference now to the drawings, and in particular to FIG. 1 thereof, a new and improved vehicular variable brake light intensity system embodying the principles and concepts of the present invention and generally designated by the reference numeral 10 will be described.

The present invention, the new and improved vehicular variable brake light intensity system, is comprised of a plurality of components. Such components in their broadest context include a brake pedal potentiometer, variable voltage regulator, power amplifier, peak detector, oscillator, and multivibrator. Such components are individually configured and correlated with respect to each other so as to attain the desired objective.

More specifically, it will be noted that the system 10 of the present invention includes a brake pedal potentiometer 12. The brake pedal potentiometer includes a brake pedal with a brake arm 14 hingably coupled at an inboard end to a vehicle 16. A pad 18 is fixed to an outboard end of the brake pedal. A frame 20 is integrally formed at an intermediate extent of the brake arm. The frame includes a top face coupled to the brake arm, a bottom face coupled to the brake arm beneath the top face, and a pair of closed side faces coupled between the top face and bottom face. The frame thus has an interior space with access afforded thereto via a pair of opposite open side faces. The open side faces are situated perpendicularly with respect to the direction of motion of the brake arm. The brake pedal potentiometer further includes an arcuate rod 22 with a predetermined resistivity coupled at a first end to the vehicle. The rod is situated within the interior space of the frame in axial alignment with the direction of motion of the brake arm. A spring biased contact 24 is positioned on an interior surface of one of the closed side faces with the spring biased contact abutting the potentiometer. A guide roller 26 is situated on a closed side face opposite the spring biased contact. Another contact 28 is connected to the inboard end of the rod. As such, the resistivity between the contacts changes with the motion of the brake arm during braking. For protecting the rod and contacts, a housing 30 is provided with an elongated cut out formed on a lower surface thereof for allowing the movement of the brake arm therein. Preferably, the rod is coupled to an interior face of the housing.

Figure 5:
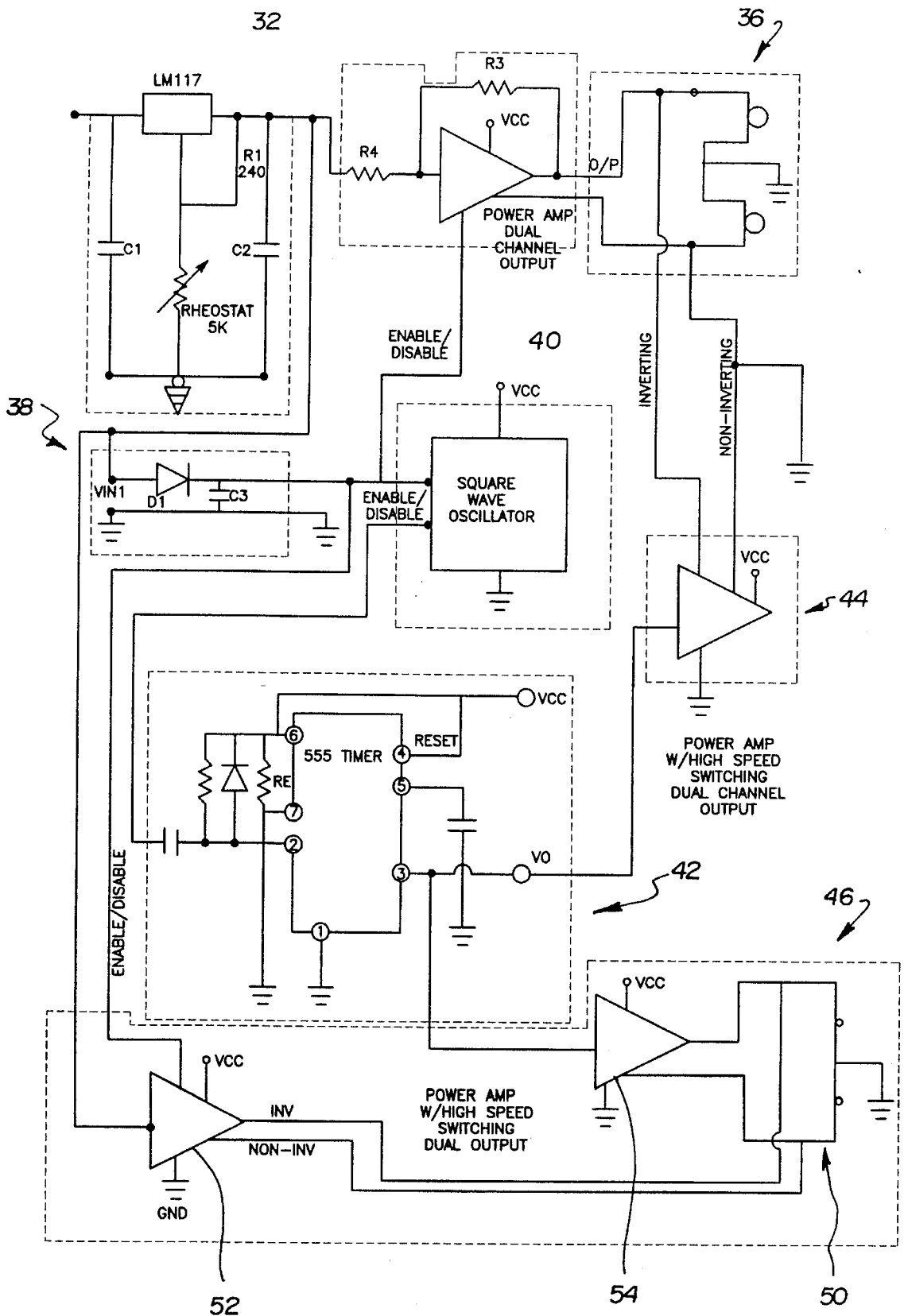
FIG. 5 is a schematic depicting the interconnection of electronic components of the present invention.

As shown in FIG. 5, a variable voltage regulator 32 is connected to the contacts of the brake pedal potentiometer. The variable voltage regulator is included for producing a ramp voltage at an output thereof. Such voltage ramp is a function of the resistivity between the contacts. The variable voltage regulator includes a pair of capacitors coupled in parallel with the brake pedal potentiometer. The capacitors and brake pedal potentiometer also work in conjunction with an LM117 chip for producing the output.

Also included is a power amplifier 34 having a pair of outputs connected to a set of conventional brake lights 36. Dual outputs are utilized to drive the brake lights independently. An input of the power amplifier is connected to the output of the variable voltage regulator for providing power to the brake lights. The power provided is a function of the ramp voltage of the variable voltage regulator. The power amplifier is adapted to control the current which is delivered to the brake lights. The design of the amplifier is based on the maximum amount of current that the brake lights draw. A pair of resistors is coupled to the power amplifier for affording unity gain.

A peak detector 38 includes an input coupled to the output of the variable voltage regulator and an output connected to the power amplifier. The peak detector thus disables the power amplifier only upon the detection of a predetermined voltage at the input thereof. The peak detector preferably comprises a capacitor coupled between an anode of a diode and ground. The above mentioned input is taken at the cathode of the diode and the foregoing output is taken at the node between the diode and capacitor. In use, the peak detector acts as a switch for enabling one portion of the present circuitry while disabling another based on the level of braking.

Further included is an oscillator 40 having an input connected to the output of the peak detector. The peak detector produces a triggering signal at an output thereof only upon the detection of the predetermined voltage by the peak detector. The triggering signal is a square wave.

Also shown in FIG. 5, a multivibrator 42 is included having an input connected to the output of the oscillator. The multivibrator is adapted to produce a smooth pulse at the output thereof. The pulse is a function of the triggering signal of the oscillator. Since the multivibrator is governed by a triggering signal, it is of a monostable type. A 555 timer is employed in the multivibrator.

Finally, a high speed amplifier 44 has a pair of outputs connected to the brake lights and an input connected to the output of the multivibrator. The high speed amplifier is included for intermittently providing power to brake lights. Dual output technology is employed with the present amplifier so as to allow the lights to be actuated asynchronously. The power is a function of the pulse of the variable voltage regulator. The amplifier employs fast switching field effect transistors to ensure that the brake lights have a definite on and off state during heavy braking. As an option, a preamplifier may be connected between the multivibrator and high speed amplifier.

In use, the brake lights emit light with an intensity which is a function of the amount of deceleration in a first mode of operation. In a second mode of operation, the brake lights intermittently emit light upon the deceleration surpassing a predetermined amount.

It should be noted that the wiring of lights may be compensated with additional circuitry in order to prevent reverse voltage and to protect the existing circuitry. In a system with anti-lock braking, the output is controlled by a variable frequency input rather than a variable voltage input.

As shown in FIG. 5, an optional circuit 46 may be included for controlling the operation of parking lights 50 of the vehicle in addition to the brake lights. The optional circuit includes a second power amplifier 52 having a pair of outputs connected to the parking lights. An input of the second power amplifier is connected to the output of the variable voltage regulator for providing power to parking lights. The power is a function of the ramp voltage of the variable voltage regulator and is only provided when the present invention is in a first mode of operation. Also included is a second high speed amplifier 54 having a pair of outputs connected to the parking lights. An input of the second high speed amplifier is connected to the output of the multivibrator for intermittently providing power to parking lights. The power provided by the second high speed amplifier is a function of the pulse of the multivibrator and is provided only when the present invention is in a second mode of operation. The mode of operation, as in the prior embodiment, is dependent on the output of the peak detector.

The present invention may be marketed as either a feature for new vehicles or retrofitted to an existing vehicle. The vehicular variable brake light intensity system benefits any drivers concerned about the safety with which they travel, owners of large vehicular fleets, and public transportation vehicles. Such benefits are afforded by the capability of the present invention to give other drivers a clear indication of the relative rate of deceleration by indicating unmistakably the status of a vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular variable brake light intensity system comprising, in combination:

a brake pedal potentiometer comprising a brake pedal with a brake arm hingably coupled at an inboard end to a vehicle, a pad fixed to an outboard end thereof, and a frame integrally formed at an intermediate extent of the brake arm, the frame including a top face coupled to the brake arm, a bottom face coupled to the brake arm beneath the top face, and a pair of closed side faces coupled between the top face and bottom face thus defining an interior space with access afforded thereto via a pair of opposite open side faces situated perpendicularly with respect to the direction of motion of the brake arm, the brake pedal potentiometer further including an arcuate rod with a predetermined resistivity coupled at a first end to the vehicle and further situated within the interior space of the frame in axial alignment with the direction of motion of the brake arm, a spring biased contact positioned on an interior surface of one of the closed side faces with the spring biased contact abutting the potentiometer, a guide roller situated on a closed side face opposite the spring biased contact, and another contact connected to the inboard end of the rod, whereby the resistivity between the contacts changes with the motion of the brake arm during braking, wherein a housing is included for protection of the brake pedal potentiometer with an elongated cut out formed on a lower surface thereof for allowing movement of the brake arm therein;

variable voltage regulator means connected to the contacts of the brake pedal potentiometer for producing a ramp voltage at an output thereof which is a function of the resistivity between the contacts;

power amplifier means having a pair of outputs connected to a set of conventional brake lights and an input connected to the output of the variable voltage regulator means for providing power to the brake lights, wherein the power is a function of the ramp voltage of the variable voltage regulator means and the power amplifier means is adapted to control the current which is delivered to the brake lights;

peak detecting means including an input coupled to the output of the variable voltage regulator means and an output connected to the power amplifier means for disabling the power amplifier means upon the detection of a predetermined voltage at the input thereof;

oscillator means having an input connected to the output of the peak detecting means for producing a square wave triggering signal at an output thereof upon the detection of the predetermined voltage by the peak detecting means;

monostable multivibrator means having an input connected to the output of the oscillator means, the multivibrator means adapted to produce a smooth pulse at the output thereof as a function of the triggering signal of the oscillator means;

high speed amplifier means having a pair of outputs connected to the brake lights and an input connected to the output of the multivibrator means for intermittently providing power to brake lights, wherein the power is a function of the pulse of the variable voltage regulator means and the high speed amplifier means includes fast switching field effect transistors to ensure that the brake lights have a definite on and off state; and a plurality of parking lights situated on the vehicle, second power amplifier means having a pair of outputs connected to the parking lights and an input connected to the output of the variable voltage regulator means for providing power to parking lights, wherein the power is a function of the ramp voltage of the variable voltage regulator means, and second high speed amplifier means having a pair of outputs connected to the parking lights and an input connected to the output of the multivibrator means for intermittently providing power to parking lights, wherein the power is a function of the pulse of the multivibrator means;

whereby the brake lights and parking lights emit light with an intensity which is a function of the amount of deceleration in a first mode of operation and further intermittently emit light upon the deceleration surpassing a predetermined amount in a second mode of operation.

\* \* \* \* \*